(12) United States Patent
Garrison et al.

(10) Patent No.: US 7,766,047 B1
(45) Date of Patent: Aug. 3, 2010

(54) TELESCOPING DOUBLE BLOCKING PIPE PLUG

(75) Inventors: Tony R. Garrison, Bixby, OK (US);
Gregory L. Puckett, Broken Arrow, OK (US)

(73) Assignee: TDW Delaware Inc., Wilmington, DE (US)

(*) Notice: Subject to any disclaimer, the term of this patent is extended or adjusted under 35 U.S.C. 154(b) by 0 days.

(21) Appl. No.: 12/351,479

(22) Filed: Jan. 9, 2009

(51) Int. Cl.
*F16L 55/10* (2006.01)

(52) U.S. Cl. .............................. 138/89; 138/94; 138/91

(58) Field of Classification Search ................... 138/89, 138/91, 94, 94.3; 137/15.14
See application file for complete search history.

(56) References Cited

U.S. PATENT DOCUMENTS

| | | | | |
|---|---|---|---|---|
| 3,785,041 | A | * | 1/1974 | Smith ....................... 137/15.14 |
| 5,358,010 | A | | 10/1994 | Jiles |
| 5,439,032 | A | * | 8/1995 | Petrone ....................... 138/93 |
| 5,490,565 | A | | 2/1996 | Baker |
| 5,560,388 | A | | 10/1996 | Caldwell |
| 5,690,139 | A | | 11/1997 | Murphy et al. |
| 6,126,369 | A | | 10/2000 | Jiles |
| 6,286,553 | B1 | | 9/2001 | Morgan |
| 6,530,389 | B2 | | 3/2003 | Sato et al. |
| 6,634,074 | B2 | | 10/2003 | Wild |
| 6,659,133 | B2 | | 12/2003 | Russell |
| 6,745,791 | B2 | | 6/2004 | Beals et al. |
| 6,892,752 | B2 | | 5/2005 | Burlock et al. |
| 7,225,827 | B2 | | 6/2007 | Maichel et al. |
| 7,270,139 | B2 | | 9/2007 | Calkins et al. |
| 7,281,543 | B2 | | 10/2007 | Calkins et al. |
| 7,353,839 | B2 | | 4/2008 | Calkins et al. |
| 2006/0237060 | A1 | * | 10/2006 | Calkins et al. ........... 137/15.14 |
| 2008/0121302 | A1 | * | 5/2008 | Waldo ......................... 138/91 |

FOREIGN PATENT DOCUMENTS

JP  2002323190  11/2002

* cited by examiner

*Primary Examiner*—Patrick F Brinson
(74) *Attorney, Agent, or Firm*—Gable Gotwals

(57) ABSTRACT

A plugging device for double blocking a section of pipeline or piping and method for its use includes a first and second sealing element and at least one cylinder that is extendable along an axial direction of the pipe between a retracted first position and an extended second position. A means for actuating the cylinder, such as a fluid power source, is provided. When the cylinder is in the extended second position, the sealing element sealably engages an opposing cut end of the pipe. The sealing element is an elastomeric sealing element and may be cup-shaped, convex-shaped, or cork-shaped.

15 Claims, 7 Drawing Sheets

TELESCOPING DOUBLE BLOCKING PIPE PLUG

FIELD OF THE INVENTION

This invention relates generally to pipe plugs, particularly plugs for use in pipelines that carry high or low pressure fluids, high or low temperature fluids, steam, dangerous fluids, and environmentally hazardous fluids.

BACKGROUND OF THE INVENTION

"Double block and bleed" is a well-known term of art that refers to setting two seals in a pipe and opening a bleed port between the seals to ensure that the first seal is holding. Any leakage past the first seal is contained by the second seal and forced to exit through the bleed port. This arrangement ensures that the pipe is completely sealed, making it safe to work on downstream of the two seals.

Achieving double-block and bleed typically requires the use of a single, metal-to-metal plugging seal or the use of two independent pluggers and fittings. Both approaches are expensive; use relatively large, heavy components; and require a lot of equipment to properly install. Additionally, the metal-to-metal plugging seal approach does not allow for bypassing pipeline product through a fitting. If a bypass is required, a second fitting must be installed upstream of the plugging seal.

U.S. Pat. No. 7,270,139, issued to Calkins et al. on Sep. 18, 2007, discloses a cam-assisted, wedge actuated, double block and bleed, metal-to-metal plugger. A pair of wedge members is forced against a rearward surface of the metal sealing cups to simultaneously force the cups into metal-to-metal sealing contact with the sealing surfaces formed by opposing toroidal collars welded to the exterior of the pipe. Because of the metal-to-metal seal, requires that each collar have precise face surfaces and that each collar be precisely welded onto the pipe and accurately spaced in relation to one another. The plugger cannot seal against the cut and relatively rough ends of a pipe.

Another style of double block and bleed plug that eliminates many of the disadvantages of typical double block and bleed pluggers is disclosed in U.S. patent applications Nos. 11/936,182 and 12/256,150, filed by Yeazel et al. on Nov. 7, 2007 and Oct. 22, 2008, respectively. The plug includes pivotally connected plugging heads which work in combination to seal against an interior wall surface of the pipe downstream of the access opening to the pipe. The first plugging head prevents flow of product in the pipe and the second plugging head captures any leakage past the first head and forces that leakage out through a fitting. The plug may include standard sealing elements or an inflation system used in combination with inflatable sealing elements or compression packer sealing elements. Although the plug does not require a precise sealing surface, the plug is not configured to seal against the cut ends of the access opening to the pipe.

SUMMARY OF THE INVENTION

A plugging device for double blocking a section of pipeline or piping includes a first and second sealing element, each sealing element having a rearward surface and a forward sealing surface. At least one cylinder that is extendable between a retracted first position and an extended second position is in communication with the rearward surface of the sealing element.

A means for actuating the cylinder—which may be a fluid power source—is provided and the forward sealing surface engages an opposing cut end of the pipe when the cylinder is in the second extended position. The sealing element is an elastomeric sealing element and may be cup-shaped, convex-shaped element, or cork-shaped element. An internal passageway or a tubing provides fluid to each cylinder, and each cylinder may be operated independent of the other. The opposing cut end of the pipe may be square-shaped or fish-mouth-shaped.

A method for double blocking a section of pipeline or piping using a plugging device according to this invention includes the steps of:

(a) cutting and removing a length of pipe so as to leave two open and opposing pipe ends;

(b) inserting a plugging device between the opposing pipe ends, the plugging device having two sealing elements and at least one telescoping cylinder located between the two sealing elements and in communication with at least one of the two sealing elements;

(c) aligning the plugging device so that each sealing element is in axial alignment with a respective opposing pipe end; and (d) activating the cylinder to move between a retracted first position and an extended second position, the at least one of the two sealing elements being in sealing engagement with a respective opposing pipe end when the cylinder is in the extended second position.

A better understanding of the invention will be obtained from the following detailed description of the preferred embodiments taken in conjunction with the drawings and the attached claims.

DETAILED DESCRIPTION OF THE PREFERRED EMBODIMENTS

Preferred embodiments of a telescoping cylinder double block and bleed plug will now be described with reference to the drawings and the following elements:

| | |
|---|---|
| 10 | Plugging device |
| 20 | Telescoping arrangement |
| 22 | Housing |
| 24 | First cylinder |
| 26 | Second cylinder |
| 28 | Fitting |
| 30 | Cylinder rod |
| 32 | Tubing/passageway |
| 34 | Internal passageway |
| 36 | Bulkhead fitting |
| 38 | Supply line |
| 40 | Fluid source |
| 50 | Sealing element |
| 52 | Forward sealing surface |
| 54 | Elastomeric seal |
| 56 | Rearward surface |
| 58 | Circumferential surface |
| 60 | Hydraulic cylinder |
| 70 | Sealing element |
| 72 | Forward sealing surface |
| 74 | Elastomeric seal |
| 76 | Rearward surface |
| 78 | Circumferential surface |
| 80 | Containment housing |
| 82 | Fitting |
| 84 | Collar |
| 86 | Sealing surface |
| 88 | Collar |
| 90 | Sealing surface |
| 92 | Locator pin |
| 94 | Locator pin receiver |
| 100 | Pipe |
| 102 | Cut end |
| 104 | Internal wall surface |
| 106 | External wall surface |
| 112 | Cut end |
| 114 | Internal wall surface |
| 116 | External wall surface |

In the typical hot tapping application, a fitting—usually in the form of a flange—is welded on the exterior of a pipe that has flowing gas or liquid under pressure. The fitting may also be a spherical fitting that is secured to opposing toroidal collars that have been welded to the exterior of the pipe. A valve is then secured to the flange and a hot tapping machine is secured to the valve. By use of specialized equipment, a hole can then be drilled through the wall of the pipe while gas or liquid continues to flow through it. This provides access to the interior of the pipe, such as for inserting equipment to temporary block flow through the pipe while repairs are being made. The fish-mouth-shaped ends of the opposing cut ends of the pipe may be cut to provide square ends.

Figure 1:
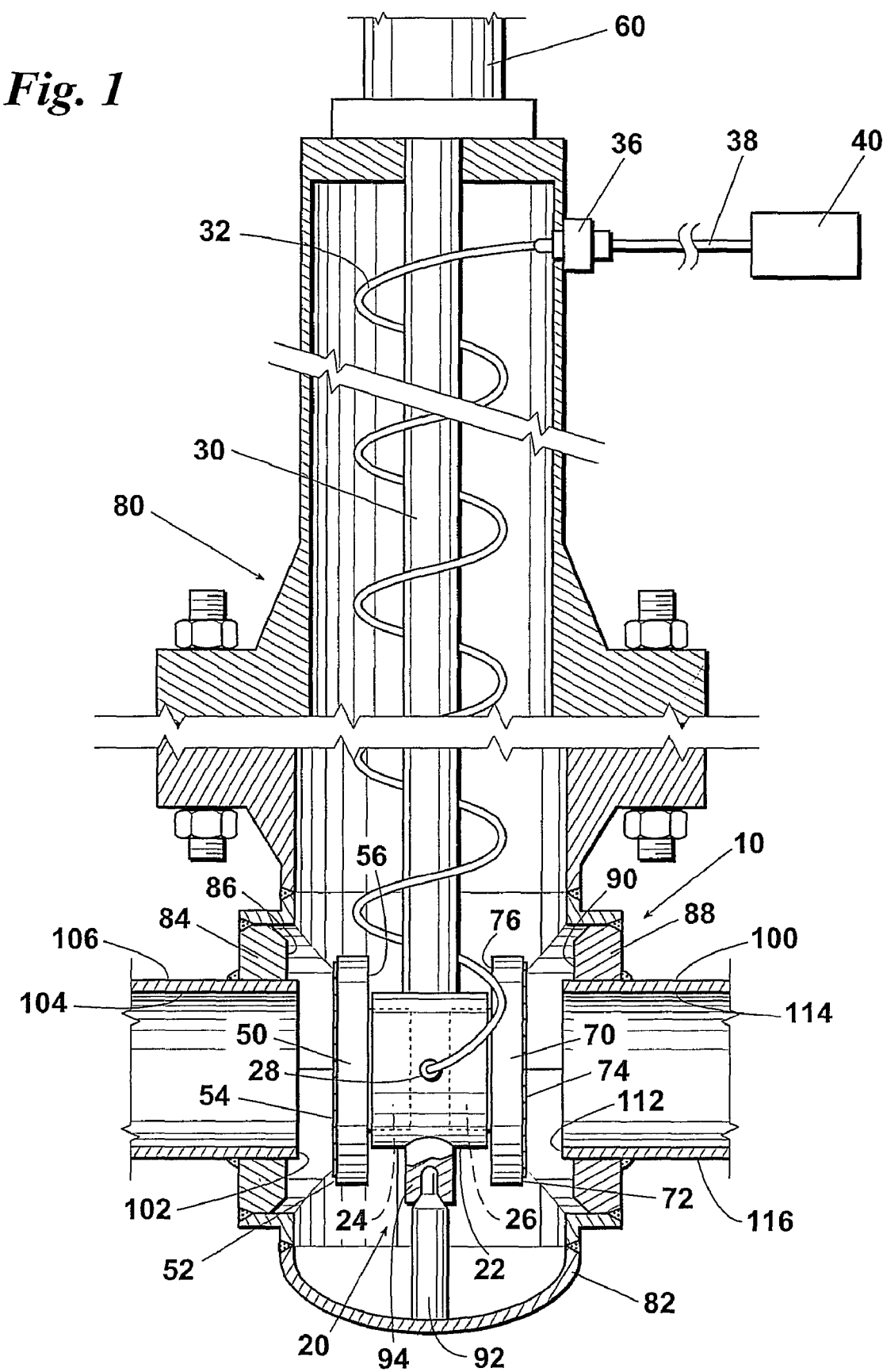
FIG. 1 is a cross-sectional view of a section of piping or pipeline in which a plugging device having two sealing elements has been inserted. Each sealing element is connected to a telescoping cylinder arrangement. A locating pin provides a means for locating the sealing elements in axial alignment with opposing cut, square ends of the pipe. A tubing connects the telescoping cylinder to a fluid power source such as a hand pump to actuate the cylinder between a retracted, first position and an extended, second position.
Figure 2:
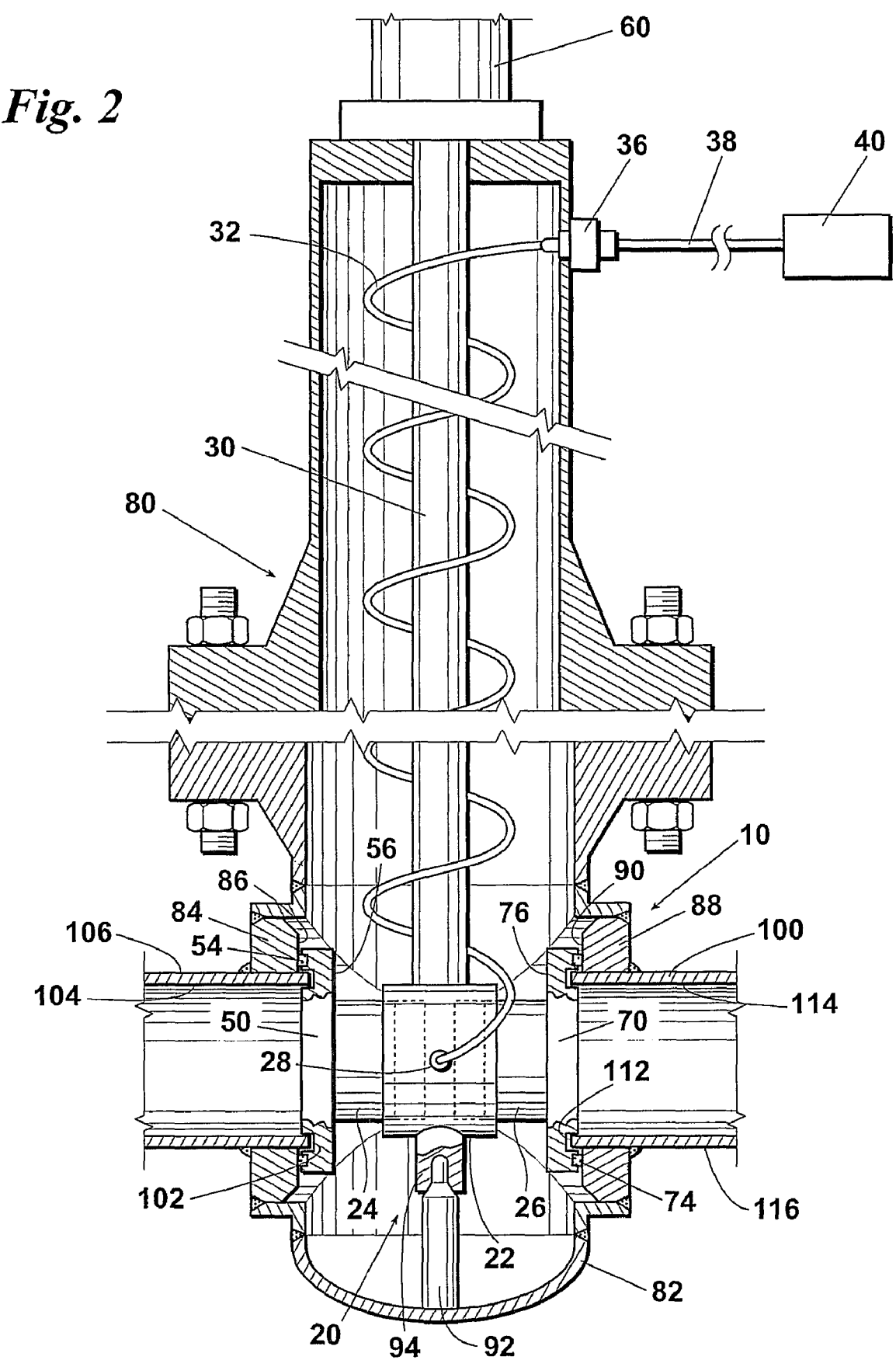
FIG. 2 is a view of the plugging device with each cylinder in its extended second position. The sealing elements sealably engage the cut ends of the pipe as well as the sealing surfaces of two opposing collars welded to the exterior of the pipe.

Referring to the drawings and first to FIGS. 1 and 2, a containment housing 80 for a hot tapping application includes a fitting 82 and two spaced-apart and opposing toroidal collars 84 and 88. Collars 84 and 88 may be part of fitting 82 or separate collars welded to an exterior wall surface 106, 116, respectively, of a section of pipe or pipeline 100. Each collar 84, 88 has a sealing face surface 86, 90, respectively. Fitting 82 may have a spherical shape.

A plugging device 10 is extended out of containment housing 80 until the downward travel of plugging device 10 is arrested by a locator receiver 94 engaging a locator pin 92. Hydraulic cylinder 60 and cylinder rod 30 provide means for lowering plugging device 10 out of containment housing 80, through the access hole, and into an interior portion of pipe 100. Locator pin 92 is designed to ensure that the sealing elements 50, 70 of plugging device 10 are in axial alignment with pipe 100. A telescoping cylinder arrangement 20 provides means for each sealing element 50, 70 to move between a retracted first position and an extended second position relative to the respective opposing cut ends 102, 112 of pipe 100.

Telescoping cylinder arrangement 20 preferably includes two cylinders 24, 26 in communication with a fluid power source 40. Cylinders 24 and 26 are housed in a housing 22 which receives a fitting 28 connected to a tubing 32. A second fitting 36 is provided on containment housing 80 for connecting fluid supply line 38 and placing line 38 in communication with tubing 32. Fluid power source 40—which may be a hand pump—supplies air, inert gas or hydraulic fluid to cylinders 24, 26.

Sealing elements 50 and 70 have a forward surface 52, 72, respectively, and a rearward surface 56, 76 respectively. A portion of the rearward surfaces 56 and 76 are in communication with the cylinders 24 and 26, respectively. Forward surface 52, 72 has an elastomeric sealing surface 54, 74. When cylinders 24 and 26 are in their extended second position, elastomeric sealing surfaces 54 and 74 engage the respective opposing sealing surfaces 86 and 90 of collars 84 and 88.

Figure 1A:
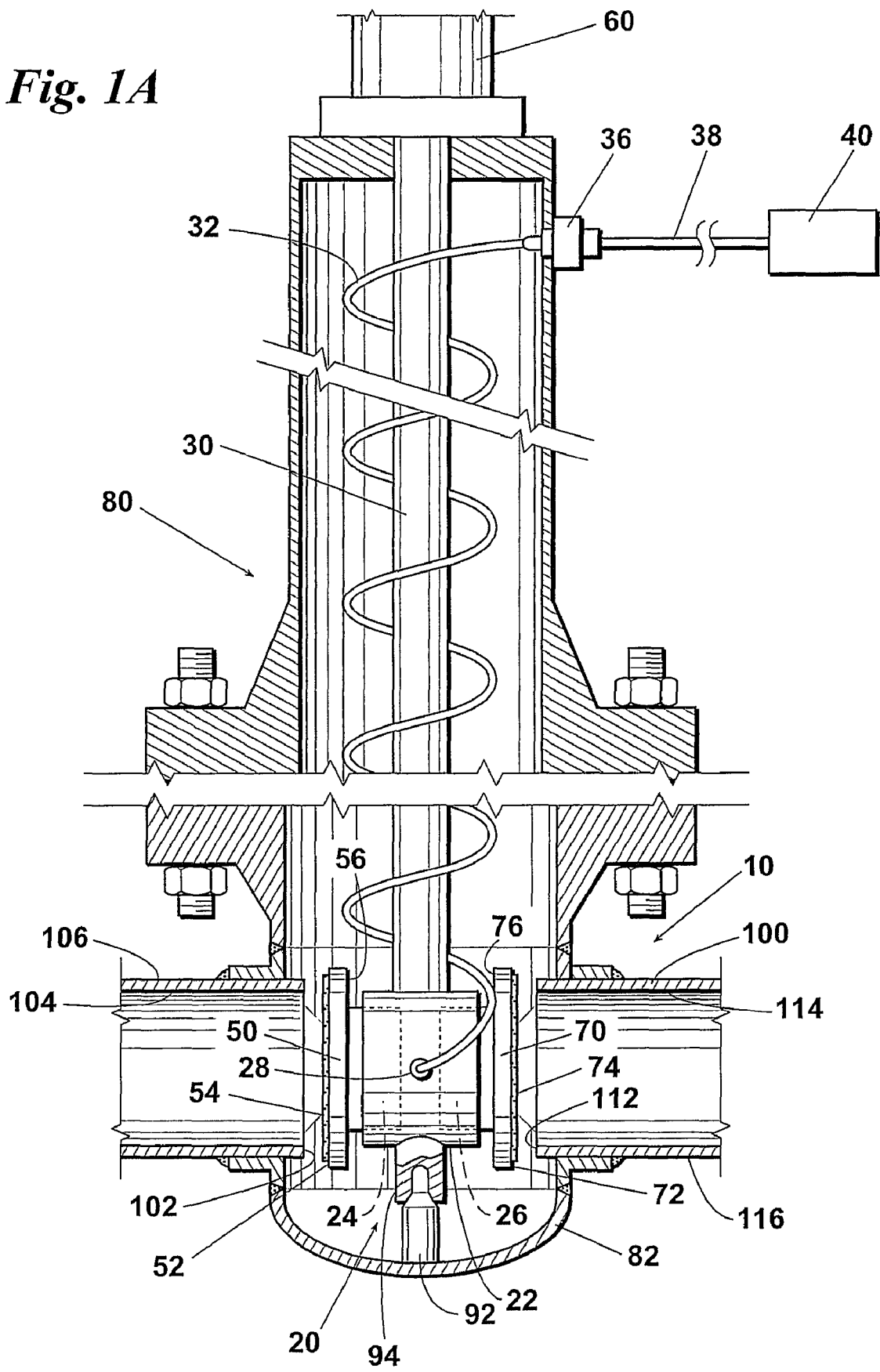
FIG. 1A is a view of a section of pipeline in which the collars with sealing surfaces have been eliminated.
Figure 2A:
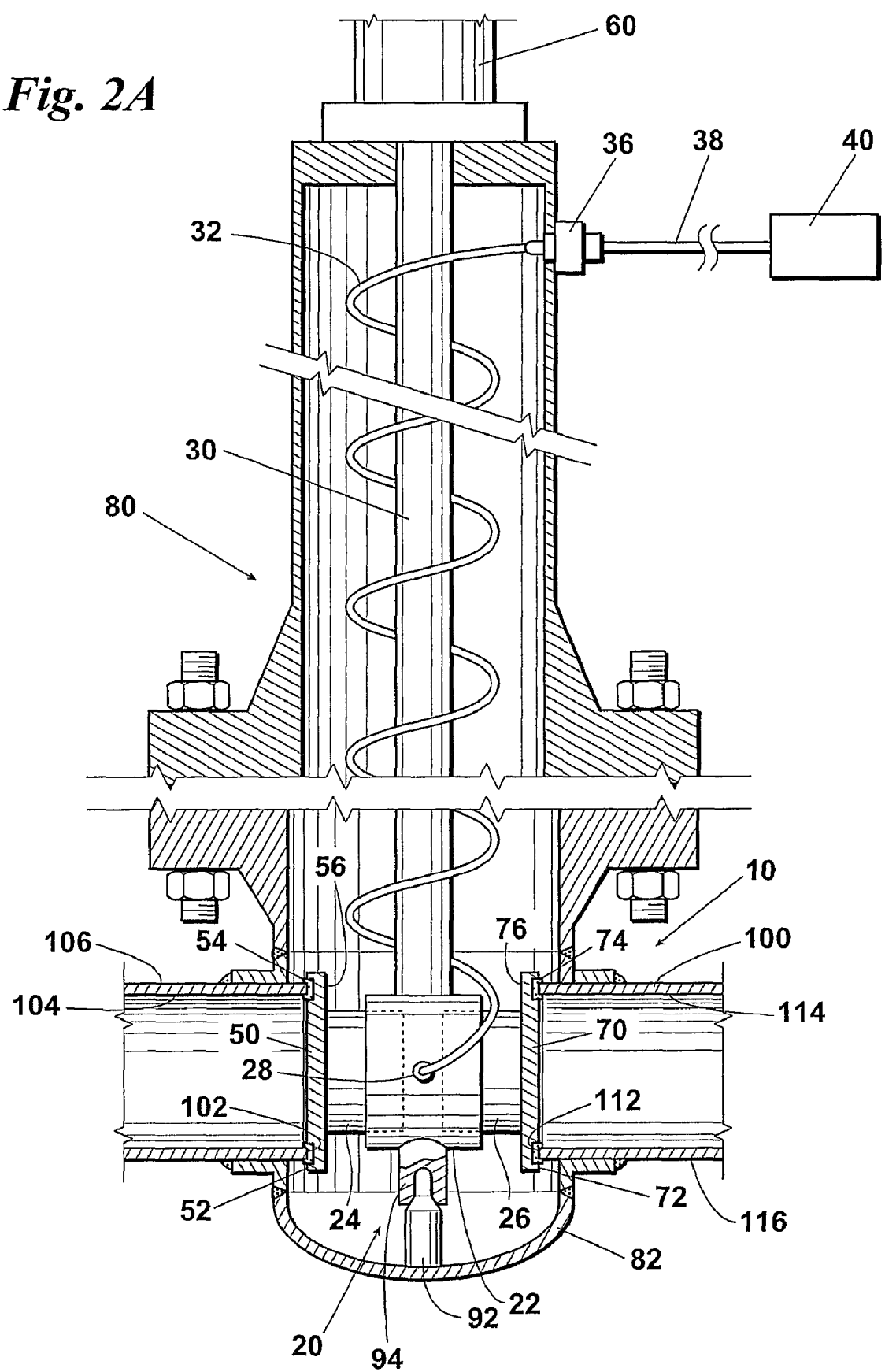
FIG. 2A is a view of the plugging device with each cylinder in its extended second position. The forward sealing surface of each element sealably engages the opposing square end of the pipe as well as portions of the interior and exterior wall of the pipe.

FIGS. 1A and 2A illustrate an alternate preferred embodiment of plugging device 10. Collars 84 and 88 are eliminated. When cylinders 24 and 26 are in their extended second position, elastomeric sealing surfaces 54 and 74 sealably engage the respective opposing cut ends 102 and 112 of pipe 100 as well as a portion of the interior walls 104 and 114 and exterior walls 106 and 116, respectively.

Figure 3A:
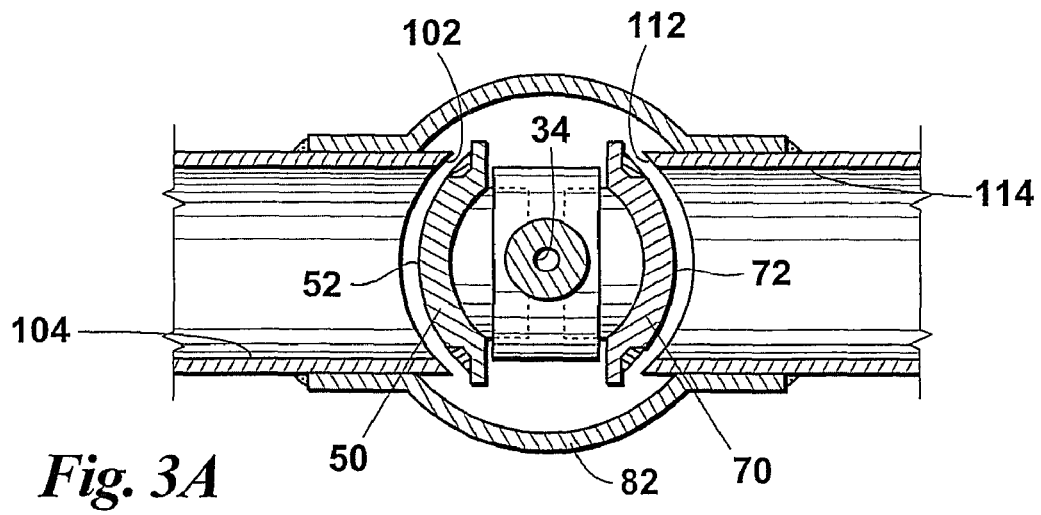
FIG. 3A is a view of the plugging device taken along section line 3A-3A of FIG. 3. The forward sealing surface of each sealing element is a convex-shaped surface to sealably engage the opposing fish-mouth-shaped ends of the pipe. An internal passageway provides a source of fluid power to the cylinder.
Figure 3:
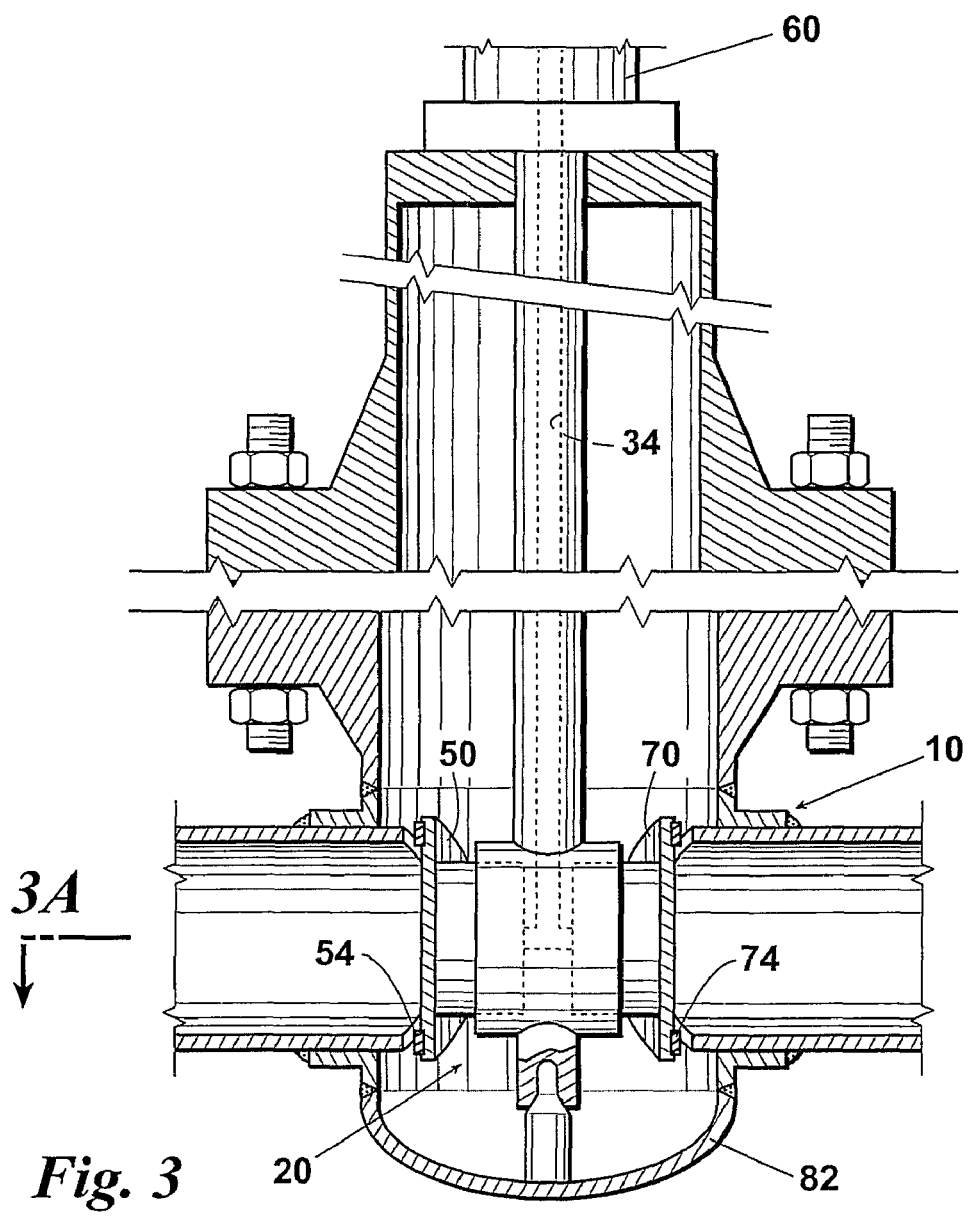
FIG. 3 is a view of the plugging device as it moves into sealing engagement with a section of pipeline having fish-mouth-shaped cut ends.

FIGS. 3 and 3A illustrate another preferred embodiment of plugging device 10. The forward surfaces 52 and 72 of sealing elements 50 and 70, respectively, are convex-shaped forward surfaces to sealably engage fish-mouth-shaped cut ends 102 and 112. Forward surfaces 52 and 72 preferably have an elastomeric sealing surface 54, 74, respectively. Tubing 32 may be replaced by an internal passageway 34.

Figure 4A:
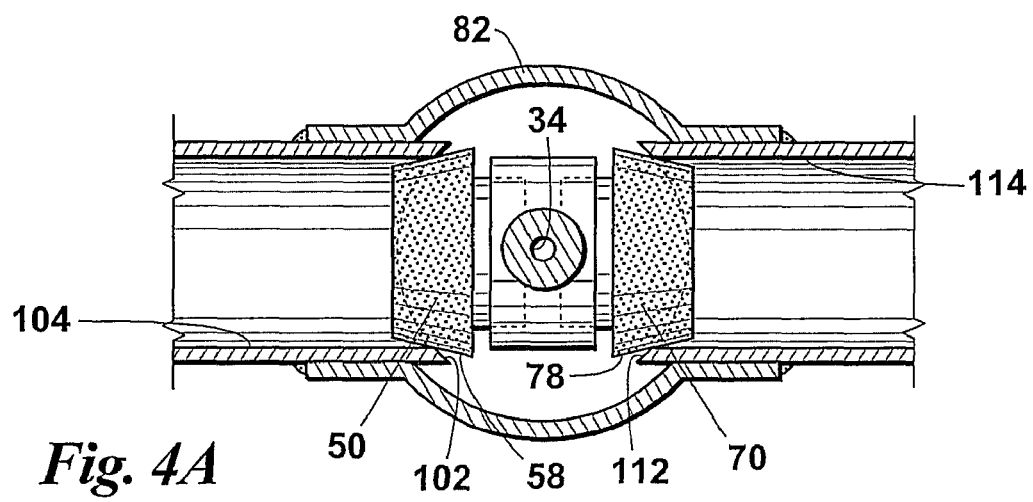
FIG. 4A is a view of the plugging device taken along section line 4A-4A of FIG. 4.
Figure 4:
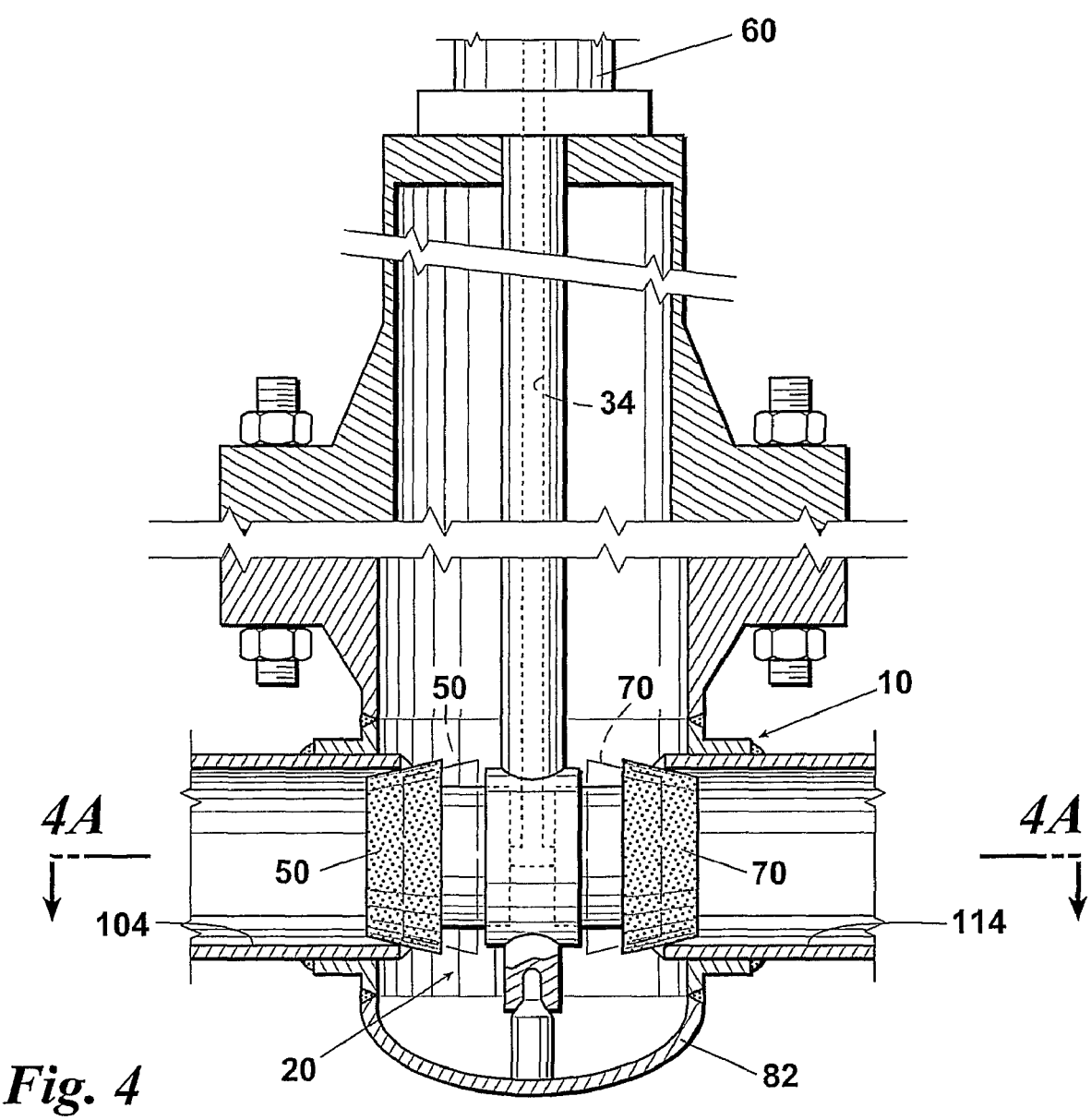
FIG. 4 is a view of the plugging device having a cork-shaped sealing element in sealing engagement with the opposing fish-mouth-shaped ends of the pipe.
Figure 5A:
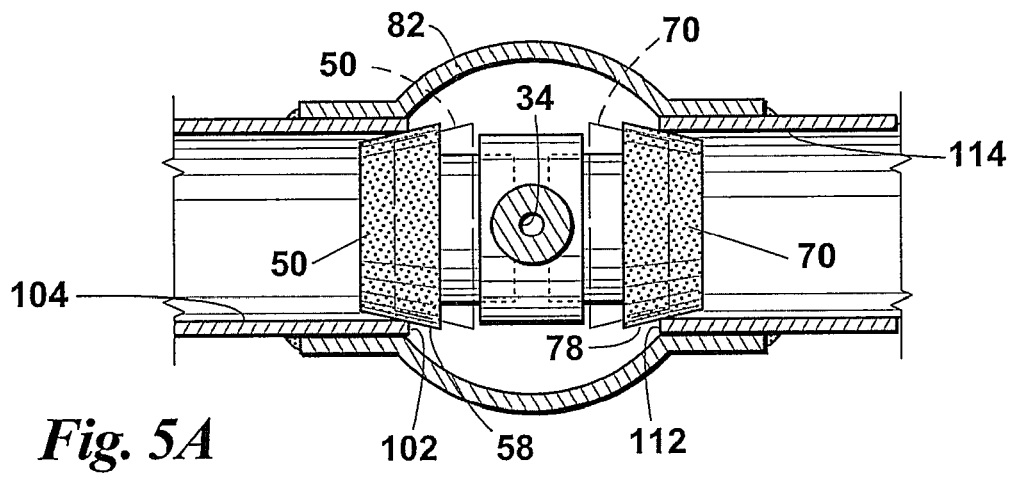
FIG. 5A is a view of the plugging device taken along section line 5A-5A of FIG. 5.
Figure 5:
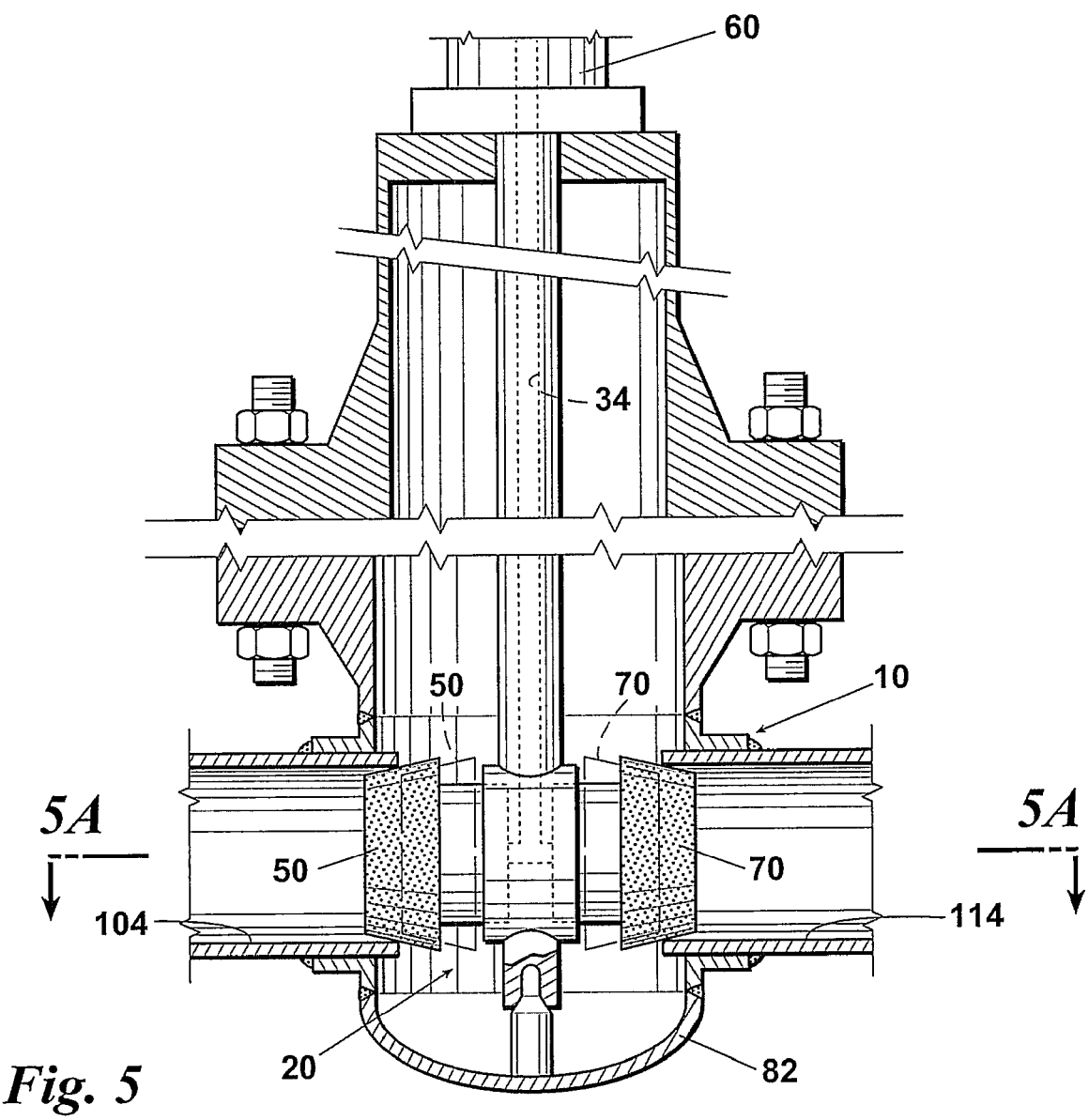
FIG. 5 is a view of the plugging device having a cork-shaped sealing element in sealing engagement with the opposing square-shaped cut ends of the pipe.

Referring now to FIGS. 4 to 5A, another preferred embodiment of plugging device 10 is illustrated. Sealing elements 50 and 70 are frusto-conical or cork-shaped elastomeric or metallic sealing elements. A circumferential surface 58, 78 of the sealing element 50, 70 sealably engages a portion of the opposing inner wall surface 104, 114 and cut ends 102 and 112. Cut ends 102 and 112 may be fish-mouth shaped ends or square-shaped ends.

While a telescoping plugging device has been described with a certain degree of particularity, many changes may be made in the details of construction and the arrangement of components without departing from the spirit and scope of this disclosure. A telescoping plugging device made according to this disclosure, therefore, is not limited to the embodiments set forth herein, but is limited only by the scope of the attached claims, including the full range of equivalency to which each element thereof is entitled.

What is claimed is:

1. A plugging device for double blocking a section of pipeline or piping comprising:
   a first and second elastomeric sealing element, each said sealing element having a rearward surface and a forward sealing surface;
   a cylinder in communication with said rearward surface of at least one of said first and second sealing elements, said cylinder being extendable between a retracted first position and an extended second position; and
   a means for actuating said cylinder;
   said forward sealing surface of said at least one of said first and second sealing elements sealably engaging an opposing cut end of a pipe when said cylinder is in the second position.

2. A plugging device according to claim 1 further comprising said means for activating said cylinder being a fluid power source.

3. A plugging device according to claim 2 further comprising a passageway, said passageway being in communication with said cylinder and said fluid power source.

4. A plugging device according to claim 1 further comprising at least one of said first and second sealing elements being selected from the group consisting of a cup-shaped sealing element, a convex-shaped sealing element, and a cork-shaped sealing element.

5. A plugging device according to claim 1 further comprising the opposing cut end of the pipe being selected from the group consisting of a square-shaped end and a fish-mouth-shaped end.

6. A method of double blocking a section of pipeline or piping comprising the steps of:
   (a) cutting and removing a length of pipe so as to leave two open and opposing pipe ends;
   (b) inserting a plugging device between the opposing pipe ends, the plugging device having two elastomeric sealing elements and at least one cylinder located between the two sealing elements and in communication with at least one of the two sealing elements;
   (c) aligning the plugging device so that each sealing element is in axial alignment with a respective opposing pipe end;
   (d) activating the cylinder to move between a retracted first position and an extended second position, the at least one of the two sealing elements being in sealing engagement with a respective opposing pipe end when the cylinder is in the extended second position.

7. A method according to claim 6 further comprising the two sealing elements each being selected from the group consisting of a cup-shaped sealing element, a convex-shaped sealing element, and a cork-shaped sealing element.

8. A method according to claim 6 further comprising steps (b), (c) and (d) being carried out within a containment housing.

9. A plugging device for blocking a section of pipe having diametrically opposed end surfaces, comprising:
   a first and second sealing element positioned between said opposed end surfaces, each said sealing element having a rearward surface and a forward sealing surface;
   a cylinder in communication with said rearward surface of at least one of said first and second sealing elements, said cylinder being extendable between a retracted first position and an extended second position, wherein at least one of said first and second sealing elements is selected from the group comprised of a cup-shaped sealing element, a convex-shaped sealing element, and a cork-shaped sealing element;
   wherein at least one of said sealing elements is an elastomeric sealing surface;
   a means for actuating said cylinder; and
   said forward sealing surface of said at least one of said first and second sealing elements sealably engaging a said end surface of said pipe when said cylinder is in said second position.

10. A plugging device according to claim 9 wherein said means for activating said cylinder comprises a fluid power source.

11. A plugging device according to claim 10 including a passageway, said passageway being in controlled communication between said cylinder and said fluid power source.

12. A plugging device according to claim 9 wherein said pipe end surfaces are selected from the group consisting of a square-shaped end surface and a fish-mouth-shaped end surface.

13. A method of blocking a section of a pipe having diametrically opposed end surfaces comprising the steps of:
   (a) cutting and removing a length of the pipe so as to leave two open and opposing pipe end surfaces;
   (b) inserting a plugging device between said opposing pipe end surfaces, the plugging device having opposed sealing elements and a cylinder located between said sealing elements;
   (c) aligning the plugging device so that each said sealing element is in axial alignment with a respective opposing pipe end surface;
   (d) activating said cylinder to move between a retracted first position and an extended second position, at least one of said two sealing elements being in sealing engagement with a respective opposing pipe end surface when said cylinder is in said extended second position; and
   (e) wherein said two sealing elements are each an elastomeric sealing element.

14. A method according to claim 13 wherein said two sealing elements are each selected from the group consisting of a cup-shaped sealing element, a convex-shaped sealing element, and a cork-shaped sealing element.

15. A method according to claim 13 wherein steps (b), (c) and (d) are carried out within a containment housing.

* * * * *